United States Patent [19]

Hisazumi et al.

[11] 4,320,175

[45] Mar. 16, 1982

[54] LAMINATED FILM

[75] Inventors: Nobuyuki Hisazumi; Shinichiro Funabashi; Katsuhiko Sugeno, all of Iwaki, Japan

[73] Assignee: Kureha Kagaku Kogyo Kabushiki Kaisha, Tokyo, Japan

[21] Appl. No.: 142,264

[22] Filed: Apr. 21, 1980

[30] Foreign Application Priority Data

Apr. 26, 1979 [JP] Japan .................................. 54/51939

[51] Int. Cl.$^3$ ............................................. B32B 27/08
[52] U.S. Cl. .................................... 428/518; 426/127; 426/129; 426/125; 428/212; 524/114; 524/273
[58] Field of Search ............... 426/127, 105, 129, 125; 428/212, 518; 260/18 EP, 18 PF

[56] References Cited

U.S. PATENT DOCUMENTS 2,679,969 6/1954 Richter .
2,872,347 2/1959 Goland et al. .
3,741,253 6/1973 Brax et al. .......................... 426/129

FOREIGN PATENT DOCUMENTS 1295820 5/1969 Fed. Rep. of Germany ... 260/18 PF

*Primary Examiner*—George F. Lesmes
*Assistant Examiner*—E. Rollins Buffalow
*Attorney, Agent, or Firm*—Wegner & Bretschneider

[57] ABSTRACT

A laminated film containing at least two layers of which one layer is a gas-barriering layer comprising a copolymer of vinylidene chloride with a reduced viscosity of 0.030 to 0.050 and the other layer is a strengthening layer arranged to be adjacent to the gas-barriering layer, comprising a copolymer of vinylidene chloride with a reduced viscosity of 0.050 to 0.075.

7 Claims, No Drawings

LAMINATED FILM

This invention relates to a laminated film comprising a copolymer of vinylidene chloride and having a high gas-barriering property and an adequate strength. The invention, more particularly, relates to a laminated film comprising at least two layers of which one layer is a gas-barriering layer prepared from a copolymer of vinylidene chloride having a reduced viscosity of 0.030 to 0.050 and no amount or extremely small amount of plasticizer and the other layer is a strengthening layer, adjacent to the gas-barriering layer, prepared from a copolymer of vinylidene chloride having a reduced viscosity of 0.050 to 0.075.

Since films formulated by extruding and processing compound comprising copolymers synthesized mainly from vinylidene chloride and an adequate amount of several modifiers such as stabilizers, plasticizers, etc. are rich in luster and transparency, excellent in pliability and gas- and water vapour-barriering, they have been used as a packing material for the goods necessitating the gas- and water vapour-barriering package, such as hams, sausages, cooked foods, etc. However, in cases of packing highly perishable foods which are very sensitive to permeated oxygen through the packing material and of packing processed meats and cooked foods which are highly sensitive to permeated moisture through the packing material or to loss of moisture also through the packing material, the above-mentioned films are insufficient in the oxygen- and water vapour-barriering property and accordingly, the appearance of a packing material having higher gas-barriering property has been desired.

In order to sufficiently improve the gas- and water vapour-barriering property of a single film or sheet made of copolymers of vinylidene chloride, several trials such as the selection of plasticizer to be added to the copolymer, the extreme reduction of the amount of plasticizer and the raising of crystalline component of the copolymer itself by raising the amount of vinylidene chloride component in the copolymer have been performed. However, in cases of reducing the amount of the above-mentioned plasticizer while using the conventional copolymer of vinylidene chloride (so-called vinylidene chloride resin), since the melt viscosity of the compound at extruding is so high that the load on the extruding screw becomes too large and the extruded compound is subjected to thermal decomposition and discoloration due to the close proximity of the compound's thermal decomposition point and melting point.

Accordingly, in order to industrially extrude and process the compound of so-called vinylidene chloride resin in a manner of melt-extrusion by using a conventional screw-type extruder without thermal decomposition and discoloration of the product, it has been inevitable to admix a considerably large amount of a plasticizer as a modifier together with a thermal stabilizer and so there has been a limit of the reduction of the amount of plasticizer.

That is, the larger the amount of plasticizer, the lower the melting point of the compound of so-called vinylidene chloride resin, accompanied by the reduction of melt viscosity and the improvement of thermal stability of the compound. On the other hand, however, the gas- and water vapour-barriering property of the thus produced film is reduced.

In these circumstances, practically it has been usual to adjust the amount of plasticizer to be admixed in a range of 4 to 15 parts by weight to 100 parts by weight of the copolymer according to the purpose and use of the thus produced film.

Furthermore, it has been known that the pliability of film, obtained from the compound with a reduced amount of plasticizer for the purpose of obtaining films of high gas-barriering property, is reduced and so the impact strength of such a film is reduced at a low temperature. That is, such a film with the reduced amount of plasticizer had a defect of causing frequent and conspicuous break of the film in the process of packing foods or during the transportation from packing process to thermal sterilization process, thus reducing the yield of packed goods.

Accordingly, the purpose of the present invention is to offer films comprising copolymers of vinylidene chloride having a higher gas-barriering property and a sufficient impact strength in spite of reducing the amount of plasticizer.

The inventors of the present invention have known from the results of studies that it is most appropriate to reduce the amount of plasticizer in order to obtain the higher gas-barriering property and in addition, that it is possible to prepare a film without the above-mentioned troubles by the use of a copolymer of vinylidene chloride of a low molecular weight, that is, of a low reduced viscosity. However, the thus obtained film has a reduced pliability and a reduced impact strength at low temperature because of its low molecular weight and of the reduced amount of added plasticizer, and so it could not be industrially practiced.

The inventors of the present invention have been struck with their finding that the lamination of a film comprising a vinylidene chloride resin of a high molecular weight, that is, of an extremely high reduced viscosity, to the above-mentioned film of the copolymer of vinylidene chloride of a low molecular weight is able to bring about the laminated body of copolymer of vinylidene chloride of high quality such as an improved pliability, a high impact strength at low temperatures and a high barriering property, and have been lead to the present invention.

The present invention is characterized by a laminated film including a barriering layer of high gas- and water vapour-barriering property formulated by a copolymer of vinylidene chloride of a reduced viscosity of 0.030 to 0.050 and a strengthening layer formulated by a copolymer of vinylidene chloride of a reduced viscosity of 0.050 to 0.075.

The followings are the more detailed explanation of the present invention.

The copolymer of vinylidene chloride for use in the present invention is mainly composed of vinylidene chloride units and preferably contains vinylidene chloride component in an amount corresponding to 65 to 95% by weight of the copolymer. In the case of containing a less amount of vinylidene chloride units, the gas-barriering property of the film obtained from the copolymer is reduced and on the other hand, in the case of containing a more amount of the units, the processing of the copolymer to the film is difficult.

The monomer copolymerizable with vinylidene chloride includes unsaturated monomers such as vinyl chloride, acrylonitrile, styrene, acrylic acid, alkyl ($C_1$ to $C_{18}$) acrylates, methacrylic acid, alkyl ($C_1$ to $C_{18}$) methacrylates, alkyl ($C_1$ to $C_{18}$) esters of itaconic acid and of maleic acid, itaconic acid, maleic acid and vinyl acetate, etc., and in the copolymerization, one or more than one of the above-mentioned unsaturated monomer may be used. From the view points of polymerizability of monomer, barriering property of the film and processability of the copolymer, copolymers with vinyl chloride are preferable.

The barriering layer and the strengthening layer according to the invention may be prepared from the copolymer of same composition or may be prepared by copolymers different in composition to each other, and the compositions of copolymers are freely selected. Since it is necessary that the copolymer for the barriering layer is possibly processed to a film without any trouble even after adding an extremely small amount of a plasticizer, or preferably even without adding any plasticizer, those having a sufficiently low reduced viscosity, that is, of 0.030 to 0.050, preferably, of 0.035 to 0.045 are used. In case of lower than 0.030, the pressure-resistant strength of the film is reduced very much owing to the too low molecular weight of the copolymer, and it is difficult to continue the industrial film forming. On the other hand, in case of higher than 0.050, the use of a small amount of the plasticizer makes the film forming difficult due to the too high melt viscosity of the compound, and the use of a large amount of the plasticizer makes the gas-barriering property of the prepared film deteriorated. The above-mentioned two cases do not answer the purpose of the present invention.

Whereas, the reduced viscosity of the copolymer for the strengthening layer is required to be sufficiently high for the purpose of strengthening the laminated film of the invention, for example, 0.050 to 0.075, preferably 0.055 to 0.065. In case of lower than 0.050, it is impossible to obtain the laminated film having a sufficient strength after combined with the above-mentioned gas-barriering layer, and in case of higher than 0.075, the film formation is difficult even after a large amount of a plasticizer is admixed, and the admix of a large amount of the plasticizer to the copolymer for the strengthening layer is not preferable because the plasticizer migrates into the barriering layer to deteriorate its barriering property or the plasticizer bleeds out to the film surface to harm the appearance.

The reduced viscosity of the copolymer in the present invention is determined by the following method: One gram of the film comprising copolymer of vinylidene chloride is added to 50 ml of tetrahydrofuran and after dissolving the film in the solvent at a temperature of 40° C. and filtering the thus obtained solution, the copolymer is precipitated by adding methanol to the solution, separated by filtration, washed with methanol and dried. To the exactly weighed 80 mg of the dried copolymer thus obtained, 20 ml of cyclohexanone at a temperature of 30° C. are added and the mixture is heated to 70° C. and maintained for 60 minutes at the temperature to obtain the completely clear solution. It is filtered by a filter paper after cooling to the room temperature to be a specimen for determination of viscosity.

Five milliliter of the specimen is placed in a Ubberhode's viscometer, and after placing the viscometer in a thermostat bath at 30° C. for 5 min., the time period for flow-down of the specimen in the viscometer is determined. The same procedure is carried out with using pure cyclohexanone. The reduced viscosity of the copolymer recovered from the film is obtained by the following formula:

$$\text{Reduced viscosity} = \tfrac{1}{4}(t_2/t_1 - 1)$$

wherein $t_1$ is the time period of flow down of pure cyclohexanone, and $t_2$ is the time period of flow down of the specimen.

The copolymers for formulating the gas-barriering layer and the strengthening layer of the present laminated film, each having the reduced viscosity of the above-mentioned range, are synthesized in a conventional apparatus for polymerization according to conventional procedures of polymerization by optionally adjusting the conditions of copolymerization such as charge-ratio of monomers, species and amount of polymerization-initiator, temperature of polymerization, extent of polymerization, additional agents in polymerization, etc. For example, the copolymer of vinylidene chloride and vinyl chloride of extremely low molecular weight, that is, of extremely low reduced viscosity for formulating the gas-barriering layer is obtained by setting up the temperature of polymerization higher than the temperature of polymerizing the copolymer for formulating the strengthening layer, the copolymer having a higher reduced viscosity, that is, having a higher molecular weight.

However, since the reduced viscosity of a copolymer depends also on the polymerization initiator, extent of polymerization, charge-ratio of monomers, additional agents in polymerization, etc., sufficient preliminary experiments are necessary in order to carry out an industrial copolymerization for obtaining the desired copolymers.

Plasticizers for formulating the gas-barriering layer of the invention are not specifically limited, and conventional plasticizers of low molecular weight or conventional high-polymeric plasticizers are possibly used. The amount of plasticizer used for formulating the gas-barriering layer is preferably less than 3 parts by weight to 100 parts by weight of the copolymer, the addition of more than 3 parts by weight making the achievement of high gas-barriering property difficult. In the case where a higher gas-barriering property is to be obtained, the amount of plasticizer should be as small as possible, preferably zero.

Although as the plasticizers for formulating the strengthening layer of the invention, those of low molecular weight and high polymeric plasticizers are possibly used. From the requests of the smaller bleedability under large amount of application and no migration to the barriering layer, an organic additive which has a number average molecular weight determined by the osmometry of 800 to 10,000, preferably of 1,000 to 3,000 are preferably used. In cases of the average molecular weight of less than 800, the organic additive is apt to migrate into the barriering layer and accordingly, they are not favourable. Those having a melting point of lower than that of the copolymer of vinylidene chloride are favourable. In cases where the melting point of the organic additive is higher than that of the above-mentioned copolymer, the organic additive itself does not melt during melt-extrusion and remains as solids in the polymer layer to harm the appearance of the film and sheet as fish eyes. Such an organic additive of high melting point exudes to the surface of the film or sheet after formulation to harm the appearance, and in the case of the laminated film, the exudation causes the exfoliation of the laminate. Accordingly, it is preferable to use the organic additive which is liquid at room temperature.

The organic additives which fulfill the above-mentioned conditions are rosin esters, hydrogenated rosin esters, oligoesters of co-condensates of dibasic acid such as adipic acid, sebacic acid, azelaic acid, etc. with polyvalent alcohol such as ethylene glycol, propylene glycol, butylene glycol, etc., and the terminal group of which oligoesters may be in the form of monobasic acid or of alcohol if necessary, epoxy resin oligomers such as co-oligomer of epichlorhydrin with bisphenol, etc., co-oligomers of styrene with butene, isobutene, 1,2- or 1,4-butadiene or maleic acid, etc., oligomers of 1,2- or 1,4-butadiene, oligomers of butene, oligomers of ethylene and oligoamides.

Among these organic additives, those of oligoester of an average molecular weight of 1,000 to 3,000, particularly of 1,500 and 2,000 formed from aliphatic dicarboxylic acid having 8 to 12 carbon atoms and polyvalent alcohol having 2 to 6 carbon atoms are preferably used. In the present invention, it is preferable to add 4 to 20 parts by weight of more than one species of the above-mentioned organic additive to 100 parts by weight of the copolymer to be used for formulating the strengthening layer.

In this case, the addition of less than 4 parts by weight of the above-mentioned organic additive is not able to give a sufficient impact strength to the processed layer, and on the other hand, the addition of more than 20 parts by weight of the organic additive exceeds the solubility of the organic additive in the copolymer of vinylidene chloride causing a conspicuous exudation which presents a problem of stickiness of the surface of the film or sheet. The stickiness causes the adherence and blocking of adjacent films or sheets to each other resulting in the unfavorable impairment of packing aptitude, of sliding property with metallic materials and of aptitude to packing machine.

In addition, in the present invention, heat stabilizers, inorganic powdery substances, organic lubricants and colouring agents are possibly added according to the necessity, and it is possible to add agents which improve the impact strength of the barriering layer, to the copolymer for each layer.

Conventional heat stabilizers are possibly used in the present invention, and particularly, stabilizers of epoxy-type are effective. The stabilizers of epoxy-type herein mentioned are those having epoxy group(s) consisting of three membered ring of carbon-carbon-oxygen. They act as an absorbent of hydrogen chloride evolved on the thermal decomposition of the copolymer of vinylidene chloride and accordingly, used for preventing the deterioration of the copolymer. They are treated differently from the plasticizers mentioned in the present invention.

Examples of the stabilizer of epoxy-type for use in the present invention are epoxidized product of a vegetable oil such as soybean oil, safflower oil, sunflower oil, linseed oil, cotton seed oil, etc., monoesters of epoxidized aliphatic fatty acid represented by octyl epoxidized-stearate, diesters of epoxidized fatty acid obtained by epoxidizing glycol ester of unsaturated fatty acid, alicyclic epoxide such as esters of epoxidized hexahydrophthalic acid, and it is used in an amount of 0.3 to 3 parts by weight to 100 parts by weight of the copolymer of vinylidene chloride. Among the above-mentioned stabilizer of epoxy-type, epoxidized vegetable oils excellent in low volatility, low migration, oil-resistance, healthiness, etc. are specifically put to use.

The above-mentioned stabilizer of epoxy-type is possibly added to both of the copolymers for formulation of the barriering layer and the strengthening layer, respectively, however, it is particularly preferable to use the stabilizer of epoxy-type for the formulation of the barriering layer to which no plasticizer is used, from the view point of processability and heat stability.

In addition, for the purpose of preventing the sticky adherence of the films or sheets to each other and of improving the adaptability of the films or sheets to packing machines by the improvement of sliding property to metallic materials, 0.01 to 3 parts by weight of inorganic powdery substances such as diatomaceous earth, talc, silica, calcium carbonate, etc. and organic lubricants such as fatty acidamides, higher alcohols, metallic soaps, fatty acid ester of sorbitan, etc. is possibly added, according to the necessity, to 100 parts by weight of the copolymer for formulating the barriering layer or the strengthening layer.

Furthermore, as a colouring agent, inorganic or organic pigment is possibly added to the copolymer for formulating the barriering layer or the strengthening layer in an amount of 0.05 to 10 parts by weight to 100 parts by weight of the copolymer according to the necessity.

As an agent for improving the impact strength of the layers, a rubber-like resin such as so-called MBS resin, ABS resin, copolymers of ethylene and vinyl acetate, etc. is used according to the necessity. Among them, the MBS resin is preferably used because it is favorably compatible with the compound of copolymer of vinylidene chloride and is able to improve the impact strength of the layers without imparing the transparency of the layer and the film-formulating property of the copolymer of vinylidene chloride. The MBS resin is possibly added to 100 parts by weight of the copolymer for formulating the strengthening layer in an amount of less than 20 parts by weight. As an MBS resin, for example, BTA-4SS manufactured by Kureha Chemical Industry Co., Ltd. is mentioned. BTA-4SS is obtained by grafting 20 to 50 parts by weight of a mixture of methyl methacrylate and styrene in the presence of 0.01 to 5 parts by weight of a cross-linking agent into 80 to 50 parts by weight of a rubber-like substance which presents in a latex obtained by copolymerization of butadiene and styrene in which butadiene is predominant.

The laminate film according to the present invention, as stated above, comprises at least two layers of which one is the gas-barriering layer formulated mainly from a copolymer of vinylidene chloride showing a reduced viscosity of 0.030 to 0.050 and the other is the strengthening layer, as an adjacent layer to the gas-barriering layer, formulated mainly from a copolymer of vinylidene chloride showing a reduced viscosity of 0.050 to 0.075. The laminate film may be produced by any one of the publicly known laminating methods such as co-extruding method, laminating method, etc., and according to the necessity, an adhesive being possibly used between the above-mentioned layers.

The laminated film according to the present invention is possibly provided with a sufficient heat-resistance by using biaxially stretched film obtained by co-extrusion method, and so the thus prepared laminated film is possibly used as a packing material subjected to retort-sterilization. After processed to be seamless tubes or seamed tubes, it is possibly used as a packing material for hams, sausages, processed and kneaded meats, cooked foods, etc. In addition, the laminated film of the present invention may be used as a high gas-barriering material. For example, a film or sheet comprising polyethylene, polypropylene, copolymers of ethylene and vinyl acetate, etc., may be adhered to the laminated film of the present invention and is possibly used as a packing material for foods requiring high gas-barriering property or high water-vapour-barriering property.

The followings are the exemplification of the present invention while referring to Examples:

EXAMPLES 1-8 AND COMPARATIVE EXAMPLES 1-3

A copolymer $X_1$ was synthesized by copolymerizing a mixture of vinylidene chloride and vinyl chloride of a monomer charge-ratio by weight of 80:20 in an autoclave according to the conventional process of suspension polymerization. The reduced viscosity of $X_1$ was 0.059. In a similar manner, a copolymer $X_2$ showing a reduced viscosity of 0.056 was synthesized by polymerizing 87.5 parts by weight of vinylidene chloride, 12.5 parts by weight of vinyl chloride and 6.5 parts by weight of lauryl acrylate. These copolymers $X_1$ and $X_2$ were used for formulating films of the strengthening layers.

The other copolymers $Y_1$, $Y_2$ and $Y_3$ were respectively obtained by a conventional process of suspension polymerization under the adjusted conditions, especially at a higher temperature than the temperature in conventional polymerization. The monomer charge-ratios by weight and the reduced viscosity of the respective copolymers $Y_1$, $Y_2$ and $Y_3$ were tabulated as follows:

| Copolymer | Monomer charge ratio in parts by weight of vinylidene chloride to vinyl chloride | Reduced viscosity |
|---|---|---|
| $Y_1$ | 78/22 | 0.035 |
| $Y_2$ | 71/29 | 0.040 |
| $Y_3$ | 74/26 | 0.045 |

In the next place, the films of the gas-barriering layer were prepared as follows:

Into each 100 parts by weight of respective copolymers of $Y_1$, $Y_2$ and $Y_3$, 1.5 to 2.0 parts by weight of epoxidized linseed oil (a) or epoxidized soybean oil (b) were added together with or without 2.0 parts by weight of dibutyl sebacate (hereinafter referred to as DBS) as a low-molecular weight plasticizer as shown in TABLE I and the mixtures were respectively melt-extruded by using an extruder having a tubular nozzle, and after quenching the extruded material to a temperature of 5° to 10° C., and then preheating it to a temperature of 15° to 45° C., it was pinched between two sets of pinch-rollers and inflated by the air introduced into the extruded tubular material pinched between the pinch-rollers, to be stretched into the lengthwise and breadthwise directions at a stretching ratio of 2.5 to 4.5 The thus inflated material having a tubular film-like appearance was flattend by a set of pinch-rollers and then cut its both ends to be a single film of 10 microns in thickness. At the extrusion, the extrudablity of copolymers $Y_1$, $Y_2$ and $Y_3$ were sufficient to formulate the gas-barriering layer.

On the other hand, when the copolymer $X_1$ of a reduced viscosity of 0.059 after adding 1.5 parts by weight of the stabilizer of epoxy-type (a) to 100 parts by weight of $X_1$ was subjected to melt-extrusion without adding any plasticizer, any satisfactory extrusion could not be carried out because of a large load on the screw of the extruder due to the too-high melt-viscosity of the copolymer $X_1$, resulting to the continuous flow out of a coloured tube owing to discoloration.

While on the extrusion of the following compositions prepared by using 100 parts by weight of the copolymers $X_1$ or $X_2$ and by adding 1.5 parts by weight of the stabilizer of epoxy-type (a) or (b), 12 to 17 parts by weight of an organic additive of condensate (c) of ethylene glycol with sebacic acid, having its chain-ends butanolated and having an average molecular weight of 2,000, or another organic additive of condensate (d) of butylene glycol with adipic acid, having its chain ends actylated and having an average molecular weight of 1,700, and 8 to 10 parts by weight of MBS resin as an agent for improving the impact strength, or another composition prepared by using 12 parts by weight of DBS instead of (c) or (d) in the above-mentioned compositions, as shown in TABLE 1 inflated films for the strengthening layers of the invention could be smoothly obtained in thickness of 15 to 30 microns.

The thus obtained film for use as a gas-barriering layer, of 10 microns in thickness and the thus obtained film for use as a strengthening layer, of 30 microns in thickness were adhered together by applying a pressure of rollers, while taking care not to bring air between the two layers, to be a two-layered film of 40 microns in total thickness.

The results of determination of the amount of gaseous oxygen permeating through the thus prepared two-layered films just after preparation and after 30 days of leaving at room temperature, by a tester, Model OX-TRAN-100 manufactured by MODERN CONTROL COMPANY are shown in TABLE I.

Two comparative laminated films were prepared as shown in TABLE I by the method of pressure-lamination similar to that above-mentioned as Comparative Examples 1 and 3:

The laminated film of Comparative Example 1 is formed by laminating two films, each of which is 20 microns in thickness and formulated from a composition comprising 100 parts by weight of copolymer $X_1$ of a reduced viscosity of 0.059, 1.5 parts by weight of the stabilizer of the epoxy-type (a) and 8.0 parts by weight of DBS.

The laminated film of Comparative Example 3 is formed by laminating two films, each of which is 20 microns in thickness and formulated from a composition comprising 100 parts by weight of copolymer $Y_2$ and 1.5 parts by weight of the stabilizer of epoxy-type (a).

A single layer of 40 microns in thickness of Comparative Example 2 was separately prepared from the composition indicated in TABLE I.

On these two laminated films and one single film (40 microns in thickness), determination of the amount of gaseous oxygen permeating through them was carried out by the same method as described above, and the results are also shown in TABLE I.

As are seen in TABLE I:

(i) The gas-barriering property of every laminated film of Examples 1 to 8 was superior to that of every laminated film and the thicker single film of Comparative Examples 1 to 3, (ii) especially, in the laminated films of Examples 1 to 6, the gas-barriering property just after lamination and that after 30 day-leaving at room temperature were the same, showing the maintenance of high gas-barriering property, (iii) in the case where an extremely small amount of a low-molecular weight plasticizer was added to the composition for the gas-barriering layer as in Examples 3 and 4, gaseous oxygen-barriering property was improved after 30 days of aging, however, (iv) the gas-barriering property of the laminated films of Examples 7 and 8 showed a tendency of deterioration during the 30 days' aging.

In order to elucidate the alteration of gas-barriering property through the laspe of time, the amount of the low-molecular weight plasticizer in each layer of the gas-barriering layer and the strengthening layer was determined just after laminating and after 30 days' aging at room temperature by gas chromatography, and the results of the determination are shown in TABLE I.

As is seen in TABLE I, in the case where an extremely small amount of the low-molecular weight plasticizer was used in the gas-barriering layer, the content of the plasticizer was gradually reduced through the lapse of time, and the plasticizer was detected in the strengthening layer in which the plasticizer had not been present in the beginning. This phenomenon clearly shows that the low-molecular weight plasticizer in the gas-barriering layer migrated into the strengthening layer through the lapse of time. The deterioration of the gas-barriering property through the lapse of time seen in the laminated films of Examples 7 and 8 was elucidated to be due to the migration of the plasticizer.

In addition, the weight changes respectively in the gas-barriering layer which had not contained any plasticizer and in the strengthening layer which had contained an oligoester between just after formulation and after 30 days' aging at room temperature were extremely small, which suggesting that the migration of the oligomer from the strengthening layer into the gas-barriering layer could be negligible.

As has been described, by the process of the present invention, a higher gas-barriering property of the laminated film was obtained than by the conventional processes. Further, by adding an organic additive into the strengthening layer, the laminated film which possibly maintains its high gas-barriering property through the lapse of time is available.

Moreover, all the laminated films of Examples 1–8 showed no rupture by impact at a temperature of 10° C. in a brittle flucture test in which the laminated film was impacted with an impact stick of 500 g at the rate of 1.2 m/sec., and assured their practical impact strength. On the other hand, the laminated film of Comparative Example 3 was ruptured by impact at 10° C. in the above-mentioned brittle flucture test and so, inspite of its favorable gas-barriering property, it could not be put to practical use. In addition, the films of Comparative Examples 1 and 2 showed practically evaluable impact strength, however, they were inferior in gas-barriering to the laminated films of the present invention.

EXAMPLE 9

Two-layered laminated film having the same construction of thickness of each layer and the same composition of each layer as in Example 1 was produced but by using a multilayer extruder and according to the processes of co-extrusion and inflation.

This laminated film was tested on its gas-barriering property to gaseous oxygen after leaving at room temperature for 30 days in the same conditions as in Example 1. The results were quite the same as in Example 1, which showing that the laminated film of the present invention is also available by to co-extrusion method. On the similarly produced laminated films by co-extrusion and inflation having the same construction of thickness and the same composition of each layer as in Examples 2 to 8, almost the same results were obtained in the above-mentioned gas-barriering test using gaseous oxygen.

EXAMPLES 10–12

Single-layer films were prepared by the same process of inflation as in Example 1 using the respective copolymers of $Y_1$, $Y_2$ and $Y_3$ for the gas-barriering layer and of $X_1$ and $X_2$ for the strengthening layer. Then, three layered laminated films were prepared from these single films according to the combination shown in TABLE II by adhereing each strengthening layer onto each of both surfaces of the gas-barriering layer while applying a roller press. The results of determination of the amount of gaseous oxygen permeating through the thus prepared three layered laminated films just after the preparation and after aging for 5 days at a temperature of 40° C. are shown in Table 2.

The other laminated films of the present Examples 10 to 12 showed the improved gas-barriering property in that the amount of gaseous oxygen permeating through the laminated film of Examples 10 and 11 did not change after aging, while the amount in Example 12 was smaller after aging than before aging.

On the other hand, the conventional laminated film of Comparative Examples 4 showed an inferior gas-barriering property than that of the laminated film of the present invention and moreover, showed still inferior gas-barriering property after aging at 40° C. for 5 days.

According to the determination of the amount of the low-molecular weight plasticizer, DBS, in each layer of the laminated films of Example 12 and Comparative Example 4, it was found that:

(i) in the case of Example 12, the amount of DBS in the gas-barriering core layer showed a reduction from 1.96 parts by weight just after lamination to 0.98 parts by weight after aging, (ii) on the other hand, 0.33 parts by weight of DBS was detected in each of the outer strengthening layer of Example 12 after aging, but the strengthening layer having no plasticizer just after lamination, and (iii) in the case of Comparative Example 4, the amount of DBS in the gas-barriering core layer was 5.0 parts by weight just after lamination, and 8.80 parts by weight after aging, the increment being due to the migration from both of the outer layers during the aging.

In addition, the laminated films of Examples 10 to 12 showed no rupture in the above-mentioned impact rupture test at a temperature of 10° C., assuring the sufficient practical impact strength. The laminated film of Comparative Example 4 which showed an inferior gas-barriering property showed a sufficient practical impact strength.

TABLE I

| | Reduced viscosity of copolymer for | | Gas-barriering layer | | | Strengthening layer | | | |
|---|---|---|---|---|---|---|---|---|---|
| | gas-bar-riering layer | strength-ening layer | thick-ness (μ) | content of stabilizer of epoxy-type (parts per 100 parts of copoly-mer by weight) | content of plasticizer (parts per 100 parts of copolymer by wt.) | thick-ness (μ) | content of stabilizer of epoxy-type (parts per 10 parts of copoly-mer by weight) | content of plasticizer or organic additive (parts per 10 parts of copolymer by wt.) | content of agent for improving impact strength [MBS resin] (parts per 100 parts of copoly-mer by wt.) |
| Example | | | | | | | | | |
| 1 | 0.035(Y1) | 0.059(X1) | 10 | 2.0 (b) | — | 30 | 1.5 (a) | 15 (c) | 10 |
| 2 | 0.045(Y3) | 0.059(X1) | 10 | 2.0 (a) | — | 30 | 1.5 (a) | 17 (c) | 8 |
| 3 | 0.040(Y2) | 0.056(X2) | 10 | 1.5 (a) | 2.0 (DBS) | 30 | 1.5 (b) | 15 (d) | 8 |
| 4 | 0.040(Y2) | 0.059(X1) | 10 | 1.5 (a) | 2.0 (DBS) | 30 | 1.5 (a) | 15 (c) | 8 |
| 5 | 0.040(Y2) | 0.056(X2) | 10 | 1.5 (a) | — | 30 | 1.5 (b) | 15 (c) | 10 |
| 6 | 0.040(Y2) | 0.059(X1) | 10 | 1.5 (a) | — | 30 | 1.5 (a) | 15 (c) | 10 |
| 7 | 0.040(Y2) | 0.059(X1) | 10 | 1.5 (a) | — | 30 | 1.5 (a) | 12 (DBS) | — |
| 8 | 0.040(Y2) | 0.059(X1) | 10 | 1.5 (a) | 2.0 (DBS) | 30 | 1.5 (a) | 12 (DBS) | — |
| Comparative Example | | | | | | | | | |
| 1 | 0.059(X1) | 0.059(X1) | 20 | 1.5 (a) | 8.0 (DBS) | 20 | 1.5 (a) | 8 (DBS) | — |
| 2 | 0.059(X1) | — | 40 | 1.5 (a) | 8.0 (DBS) | — | — | — | — |
| 3 | 0.040(Y2) | 0.040(Y2) | 20 | 1.5 (a) | — | 20 | 1.5 (a) | — | — |

| | Amount of gaseous oxygen which permeated (ml/m², for 24 hr. at 30° C./atm) | | Content of plasticizer in each layer (parts per 100 parts of copolymer by weight) | | | |
|---|---|---|---|---|---|---|
| | | | just after lamination | | after standing at room temperature for 30 days | |
| | just after lamination | after standing at room temperature for 30 days | gas-barriering layer | strengthening layer | gas-barriering layer | strengthening layer |
| Example | | | | | | |
| 1 | 17.5 | 17.0 | — | — | — | — |
| 2 | 15.8 | 15.7 | — | — | — | — |
| 3 | 35.0 | 20.0 | 1.96 | 0 | 0.96 | 0.33 |
| 4 | 31.0 | 23.0 | 1.96 | 0 | 0.70 | 0.42 |
| 5 | 18.0 | 18.0 | — | — | — | — |
| 6 | 15.0 | 15.1 | — | — | — | — |
| 7 | 16.0 | 150 | 0 | 10.7 | 5.1 | 4.0 |
| 8 | 39.0 | 150 | 1.96 | 10.7 | 4.7 | 5.8 |
| Comparative Example | | | | | | |
| 1 | 210 | 210 | 7.4 | 7.4 | 7.4 | 7.4 |
| 2 | 210 | 210 | 7.4 | — | 7.4 | — |
| 3 | 4.0 | 4.0 | — | — | — | — |

TABLE II

| | Reduced viscosity of copolymer for | | | Outer layer | | | Core layer | | |
|---|---|---|---|---|---|---|---|---|---|
| | Outer layer (Strength-ening layer) | Core layer (gas-barriering layer) | Outer layer (Strength-ening layer) | Thick-ness (μ) | content of stabilizer of epoxy-type (parts per 100 parts of copolymer by wt.) | content of plasticizer or organic additive (parts per 100 parts of copolymer by wt.) | Content of MSB resin (parts per 100 parts of copolymer by weight) | Thick-ness (μ) | Content of stabilizer of epoxy-type (parts per 100 parts of copolymer by wt.) | Content of plasticizer (parts per 100 parts of copolymer by wt.) |
| Example | | | | | | | | | | |
| 10 | 0.059(X1) | 0.040(Y1) | 0.059(X1) | 15 | 1.5 (b) | 15 (d) | 10 | 10 | 1.5 (a) | — |
| 11 | 0.056(X2) | 0.040(Y1) | 0.056(X2) | 15 | 1.5 (b) | 12 (d) | 8 | 10 | 1.5 (a) | — |
| 12 | 0.056(X2) | 0.040(Y1) | 0.056(X2) | 15 | 1.5 (b) | 12 (d) | 8 | 10 | 1.5 (a) | 2.0 (DBS) |
| Comparative Example | | | | | | | | | | |
| 4 | 0.059(X1) | 0.059(X1) | 0.059(X1) | 15 | 1.5 (a) | 12 (DBS) | — | 10 | 1.5 (a) | 5.3 (DBS) |

| | Outer layer | | | | Amount of gaseous oxygen which permeated (ml/m² for 24 hours, at 30° C./atm) | |
|---|---|---|---|---|---|---|
| | Thickness (μ) | Content of plasticizer of epoxy-type (parts per 100 parts of copolymer by wt.) | Content of plasticizer or organic additive (parts per 100 parts of copolymer by wt.) | Content of MSB resin (parts per 100 parts of copolymer by wt.) | just after lamination | after aging for 5 days at 40° C. |
| Example | | | | | | |
| 10 | 15 | 1.5 (b) | 15 (d) | 10 | 16.0 | 16.0 |
| 11 | 15 | 1.5 (b) | 12 (d) | 8 | 16.0 | 16.0 |
| 12 | 15 | 1.5 (b) | 12 (d) | 8 | 40.7 | 27.0 |
| Comparative | | | | | | |

TABLE II-continued

| Example | | | | | | |
|---|---|---|---|---|---|---|
| 4 | 15 | 1.5 (a) | 12 (DBS) | — | 212.3 | 641.0 |

Notes in TABLES I and II:

$X_1$: Copolymer of vinylidene chloride and vinyl chloride with the monomer charge weight ratio of 80/20.

$X_2$: Copolymer of vinylidene chloride, vinyl chloride and lauryl acrylate with the monomer charge weight ratio of 87.5/12.5/6.5.

$Y_1$: Copolymer of vinylidene chloride and vinyl chloride with the monomer charge weight ratio of 78/22.

$Y_2$: The same as $Y_1$ except for the monomer charge weight ratio of 71/29.

$Y_3$: The same as $Y_1$ except for the monomer charge weight ratio of 74/26.

MBS resin: Model BTA-4SS, manufactured by Kureha Chem. Ind. Co., Ltd.

a: epoxidized linseed oil.

b: expoxidized soybean oil.

c: oligoester of average molecular weight of 2,000.

d: oligoester of average molecular weight of 1,700.

What is claimed is:

1. A laminate film comprising at least two layers, one layer being a gas-barriering layer composed of 100 parts by weight of a copolymer of vinylidene chloride of a reduced viscosity of 0.030 to 0.050 and 0.5 to 3 parts by weight of an epoxy-type stabilizer, and another layer being a strengthening layer arranged to be adjacent to said gas-barriering layer and being composed of 100 parts by weight of a copolymer of vinylidene chloride of a reduced viscosity of 0.050 to 0.075, 0.5 to 3 parts by weight of an epoxy-type stabilizer and 4 to 20 parts by weight of an organic additive of a number average molecular weight of 800 to 10,000, said organic additive being selected from the group consisting of rosin esters, hydrogenated rosin esters, oligoesters, epoxy rosin oligomers, co-oligomers of styrene with butene, isobutene, butadiene or maleic acid, oligoamides, oligomers of butadiene, oligomers of butene and oligomers of ethylene.

2. A laminate film according to claim 1, wherein said gas-barriering layer further contains 0 to 3 part by weight of a plasticizer.

3. A laminate film according to claim 1, wherein said strengthening layer further contains up to 20 parts by weight of MBS resin.

4. A laminate film according to claim 1, wherein said epoxy-type stabilizer is selected from the group consisting of epoxidized vegetable oils, monoesters of epoxidized fatty acids, diesters of epoxidized fatty acids and alicyclic epoxides.

5. A laminate film according to claim 1, wherein said organic additive is an oligoester formed from an aliphatic dicarboxylic acid having 8 to 12 carbon atoms and a polyvalent alcohol having 2 to 6 carbon atoms, of a number average molecular weight of 1,000 to 3,000, preferably of 1,500 to 2000.

6. A laminate film according to claim 1, wherein said strengthening layer is adhered onto one or two surfaces of said gas-barriering layer.

7. A laminate film according to claim 6, wherein the strengthening layer is adhered onto the gas-barriering layer by means of an adhesive layer.

* * * * *